Sept. 16, 1958 J. S. BARNETT 2,852,727

MECHANICAL MEMORY

Filed Aug. 20, 1956 8 Sheets-Sheet 1

INVENTOR:
John S. Barnett

By Smyth & Roston
Attorneys

Sept. 16, 1958 J. S. BARNETT 2,852,727

MECHANICAL MEMORY

Filed Aug. 20, 1956 8 Sheets-Sheet 2

INVENTOR:
John S. Barnett
By Smyth & Roston
Attorneys

INVENTOR:
John S. Barnett
By Smyth & Roston
Attorneys

Sept. 16, 1958 J. S. BARNETT 2,852,727

MECHANICAL MEMORY

Filed Aug. 20, 1956 8 Sheets-Sheet 4

INVENTOR:
John S. Barnett

By Smyth & Roston
Attorneys

Sept. 16, 1958 J. S. BARNETT 2,852,727

MECHANICAL MEMORY

Filed Aug. 20, 1956 8 Sheets-Sheet 5

INVENTOR
John S. Barnett
By Smyth + Roston
Attorneys

MECHANICAL MEMORY

Filed Aug. 20, 1956

8 Sheets-Sheet 6

INVENTOR
John S. Barnett
By Smyth & Roston
Attorneys

Sept. 16, 1958 J. S. BARNETT 2,852,727

MECHANICAL MEMORY

Filed Aug. 20, 1956 8 Sheets-Sheet 7

INVENTOR:
John S. Barnett
By Smyth + Roston
Attorneys

Sept. 16, 1958 J. S. BARNETT 2,852,727

MECHANICAL MEMORY

Filed Aug. 20, 1956 8 Sheets-Sheet 8

INVENTOR:
John S. Barnett
By Smyth & Roston
Attorneys

United States Patent Office 2,852,727 Patented Sept. 16, 1958

2,852,727

MECHANICAL MEMORY

John S. Barnett, Sepulveda, Calif., assignor to Photographic Analysis, Inc., North Hollywood, Calif., a corporation of California Application August 20, 1956, Serial No. 604,868

24 Claims. (Cl. 318—467)

This invention relates to a control system that is characterized by mechanical storage of control data for program and control purposes and is applicable to remote control as well as to automatic control. The invention includes a highly flexible, but mechanically simple, device for storing data for control purposes, which device is dependable and may be quickly and easily manipulated for data revision. As will be apparent, such a data storage device may be advantageously substituted for more complicated electronic components in control systems of various types.

For the purpose of disclosure, the invention is described first as applied to the programming of a cycle of operations for a single operator under remote control. The invention is then described as applied to the programming of a predetermined cycle of operations involving the selective control of a plurality of operators. An example of the first application of the invention is the programming of a television receiver to tune in selected channels at predetermined points on a time schedule. An example of the second application of the invention is the digital control of an automatic screw machine or turret lathe.

The mechanical storage means of the invention may be readily used for random access, but in these examples it is operated sequentially to carry out a predetermined program. The storage means comprises a support means movable along a predetermined path past a reading station, which support means has a sequence of stations thereon for registering one at a time with the reading station. Mounted on the support means at each of its stations is at least one data element to be read by corresponding reading means at the reading station. Each of the data elements is movable relative to the support means selectively to a series of positions representing corresponding data values and the reading means senses the different positions of the data element.

The data elements may, for example, be axially movable pins having their axes positioned transversely of the path of movement of the support means. In the preferred practice of the invention, the support means comprises a rotor or wheel. The data pins are mounted on the storage wheel in a circular row concentric to the axis of the storage wheel, each pin being parallel to the wheel axis.

In one practice of the invention, the reading means comprises a measuring means to ascertain the displacement of the data element from a reference position on the storage wheel. The measured distance is translated into a corresponding number of pulses for remote operation of a pulse-responsive actuator. Such an actuator may be a rotary solenoid.

In another practice of the invention, the reading means comprises a plurality of switches representing the different data positions of the data elements, the switches being respectively responsive to the corresponding positions of a data element. Here again, the reading means may control an actuator such as a rotary solenoid.

For applying the invention to the control of a television receiver, the data storage wheel is advanced by a clock mechanism and a rotary solenoid controls the channel-selector knob of the television receiver in response to the reading means, one position of the rotary solenoid being used to turn off the television receiver.

The application of the invention to the accurate control of a number of operators selectively in sequence is characterized by the use of a series of stator-rotor units corresponding to different orders of digits of a numerical system for selectively and accurately designating positions of the operators. Each digital stator-rotor unit comprises a wiper and a set of contacts corresponding to the digits of the selected numerical system. If the decimal system is used, there are ten contacts in each stator-rotor unit. For controlling a cutting tool slide on a turret lathe, for example, a lead screw having ten threads to the inch may be actuated by a motor and operatively connected to a cascade of four digital stator-rotor units for operation synchronously, the units being connected in series by 10–to–1 gearing. Thus, the digital settings of the four stator-rotor units may represent travel of the cutting tool slide in inches, tenths of inches, hundredths of inches, and thousandths of inches, respectively.

In such an arrangement, each station on the data storage wheel has four data elements or pins and the reading station has four corresponding reading means to "set" the four stator-rotor units. The "setting" of the four stator-rotor units comprises merely selecting a contact in each unit so that the four units may serve, in effect, as a limit switch to stop the cutting tool slide at the position represented by the four selected digits. Each station on the data storage wheel has an additional data element which may be termed a selector element since it determines which of a plurality of operators is energized at each step advance of the storage wheel.

In some instances, the storage wheel may be advanced automatically on a time or clock scale, for example, to operate valves for automatic control of a pipe system, or the like. In other instances, step advances of the storage wheel may be made at predetermined points in a series of pulses measuring the progress of a cycle, for example, pulses created by the revolution of a spindle shaft of a machine tool such as a turret lathe. In the present example, however, the data storage wheel is advanced one step in response to the completion of an operation represented by the corresponding station on the storage wheel without regard to the length of the operation.

The various features and advantages of the invention may be understood from the following description and the accompanying drawings.

In the drawings, which are to be regarded as merely illustrative:

Figure 8:
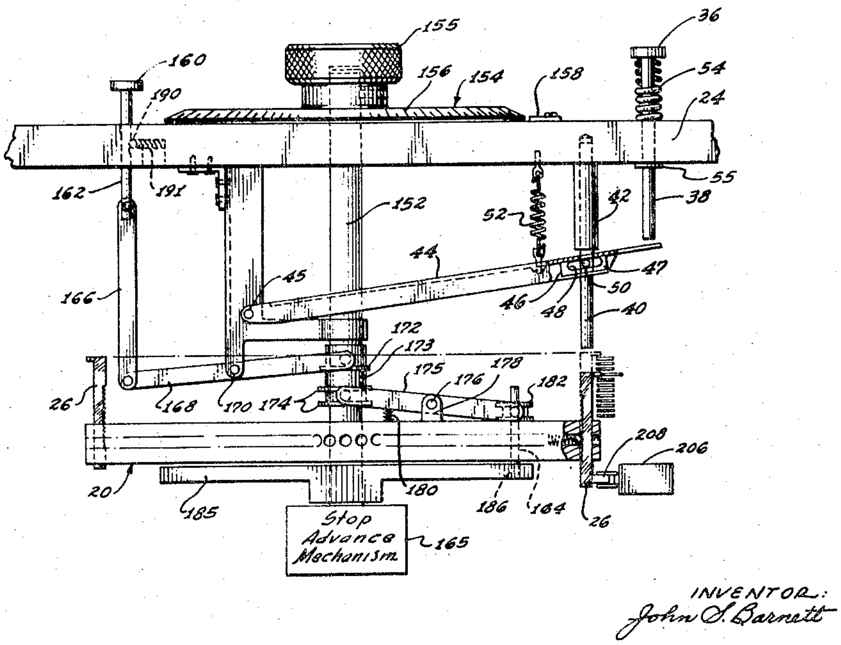
Figure 7A:
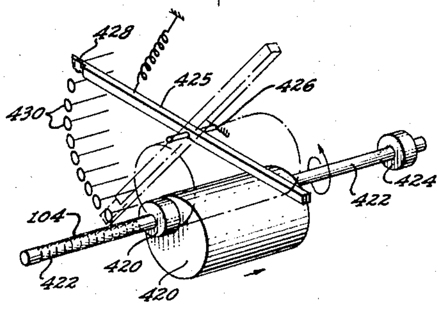
Fig. 7 is an enlarged fragmentary section of the storage data wheel in Fig. 5, showing one of the data pins mounted thereon.
Figure 5:
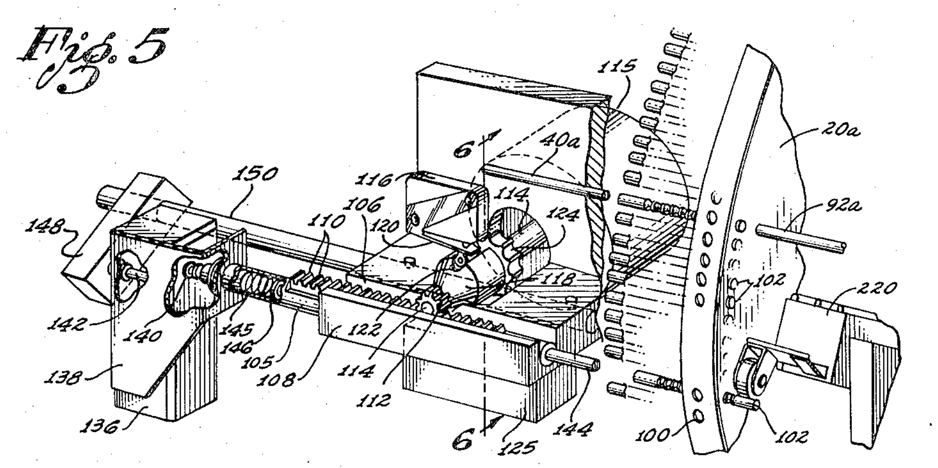
Fig. 5 is a fragmentary perspective view of a second form of data storage means together with data reading means at a reading station.
Figures 6, 7, 10:
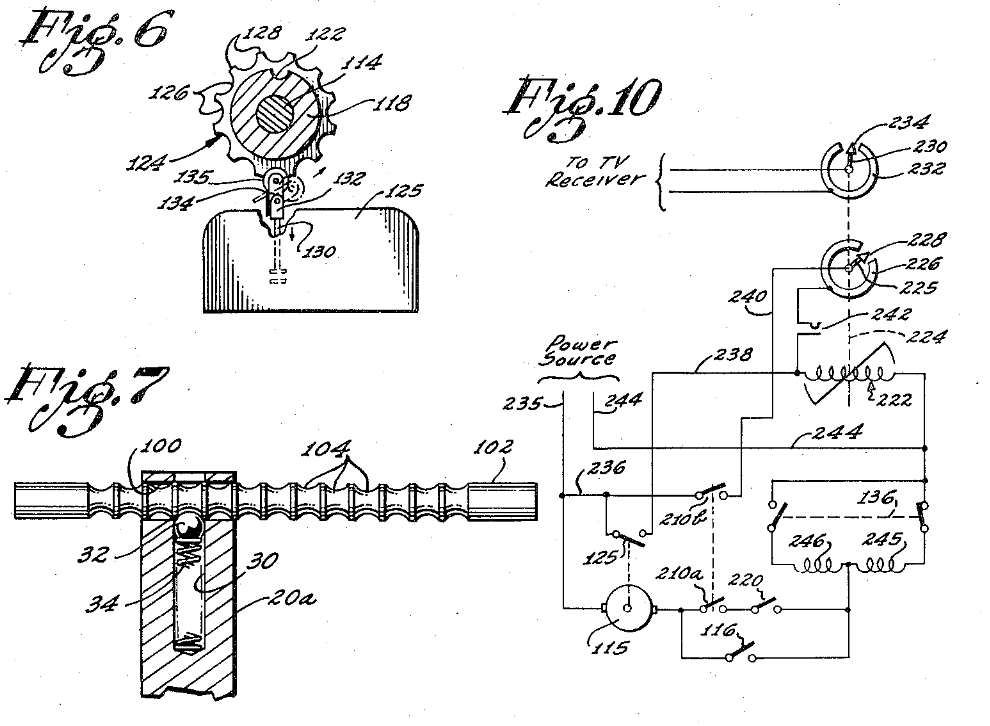
Fig. 6 is a sectional view taken as indicated by the line 6—6 of Fig. 5, and showing a pulse-generating means at the reading station.
Figure 9:
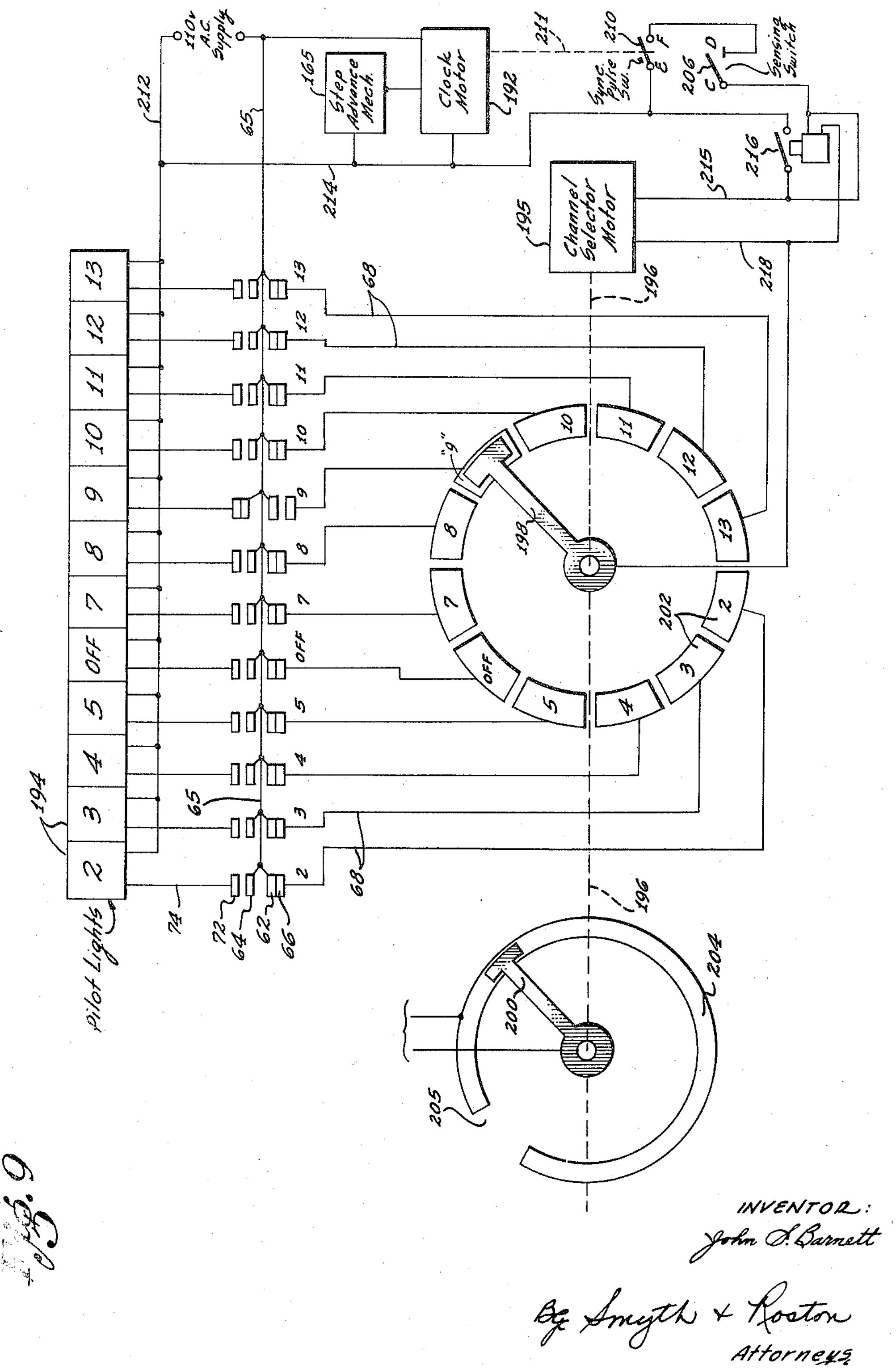
Figure 11:
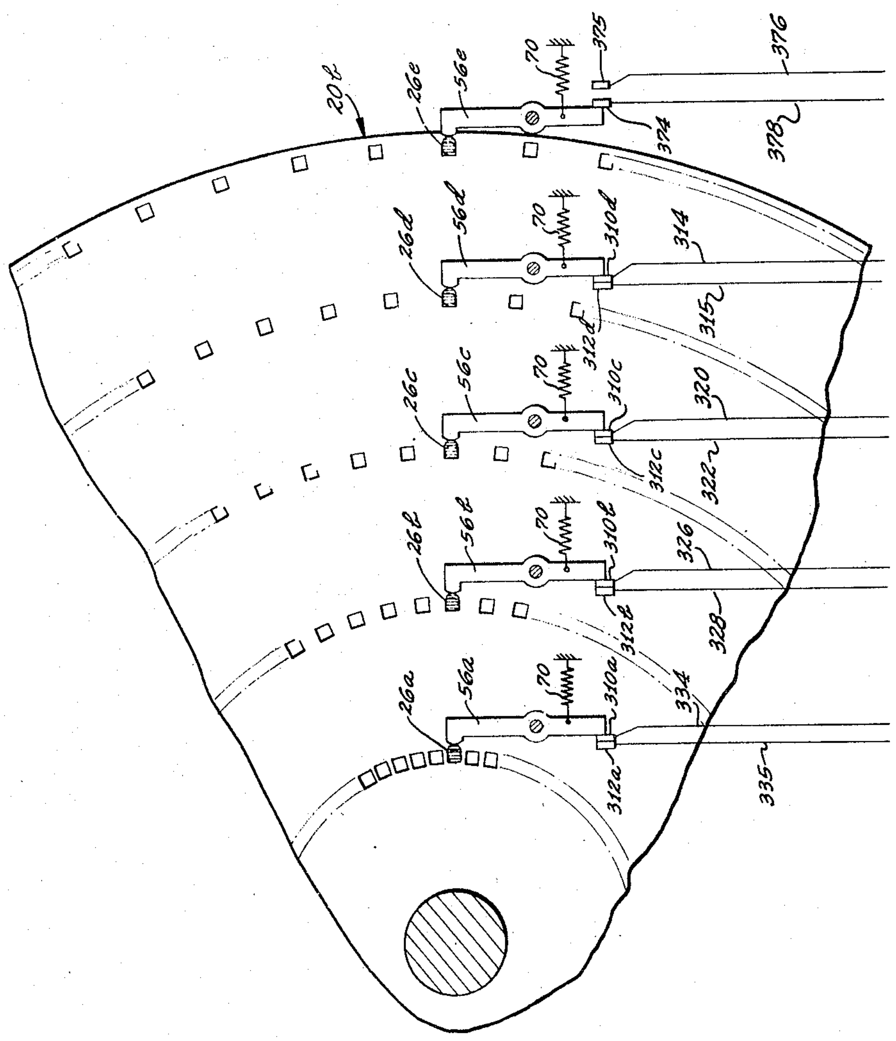
Figure 12:
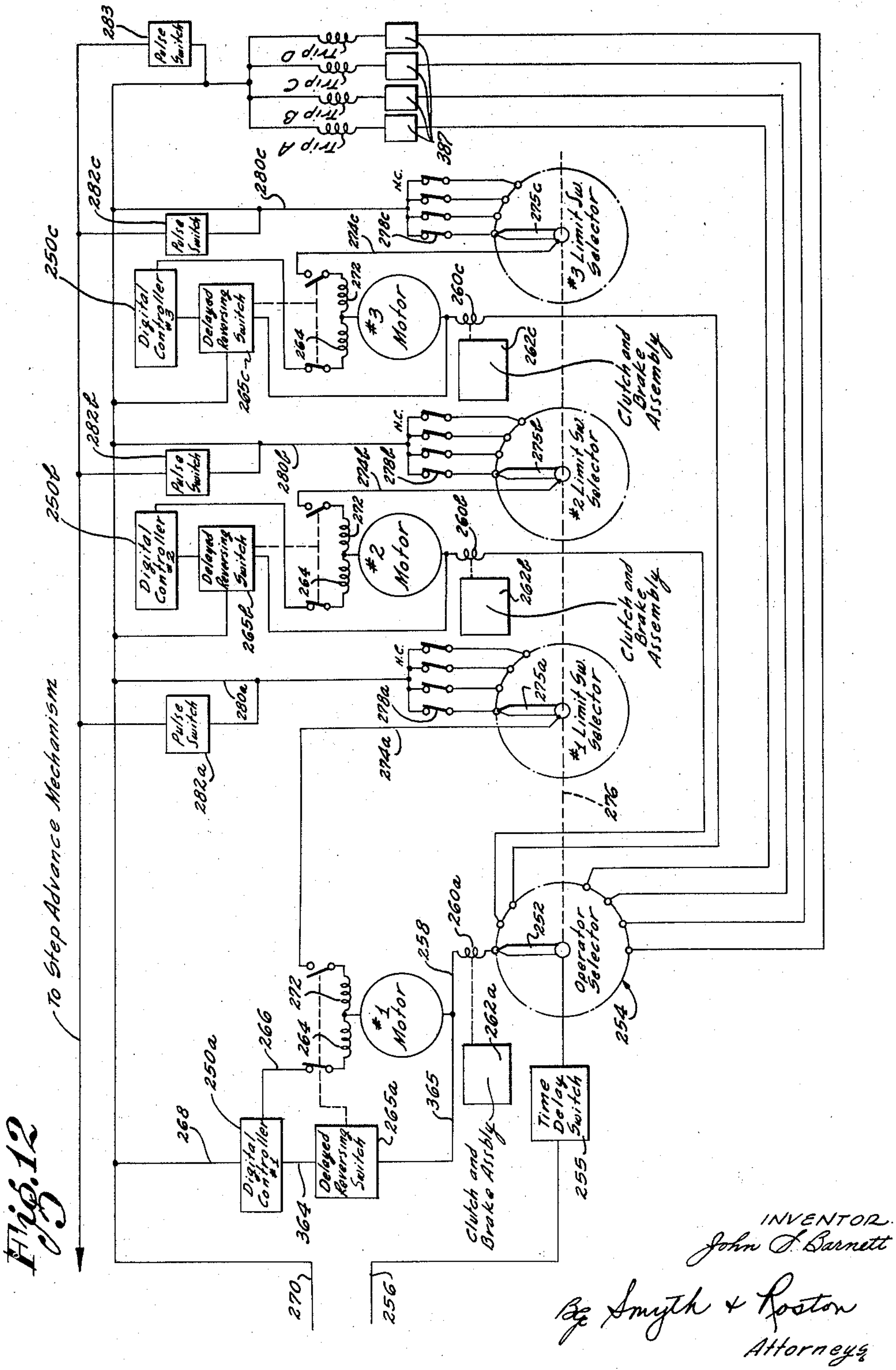
Figure 13:
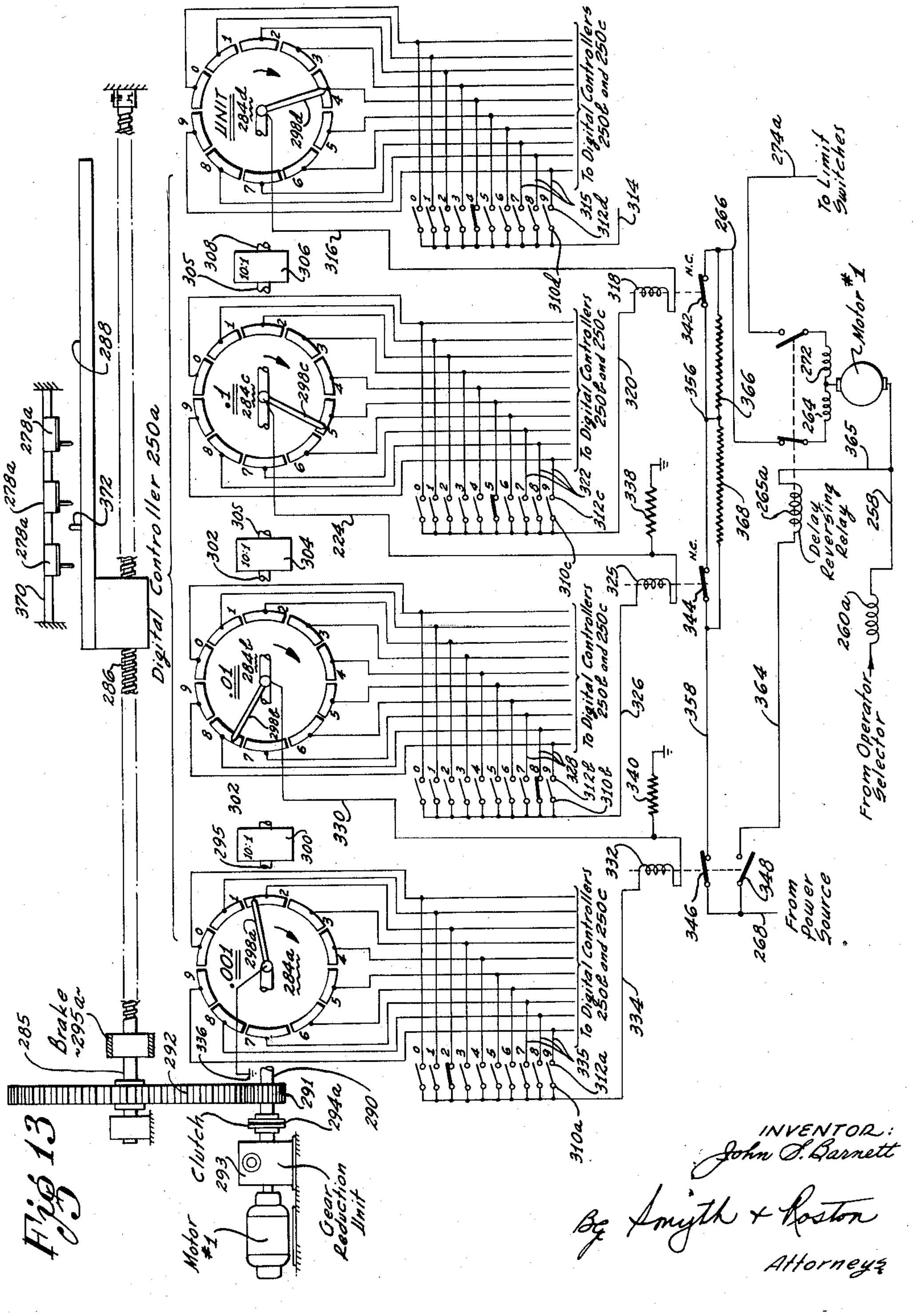
Figure 14:
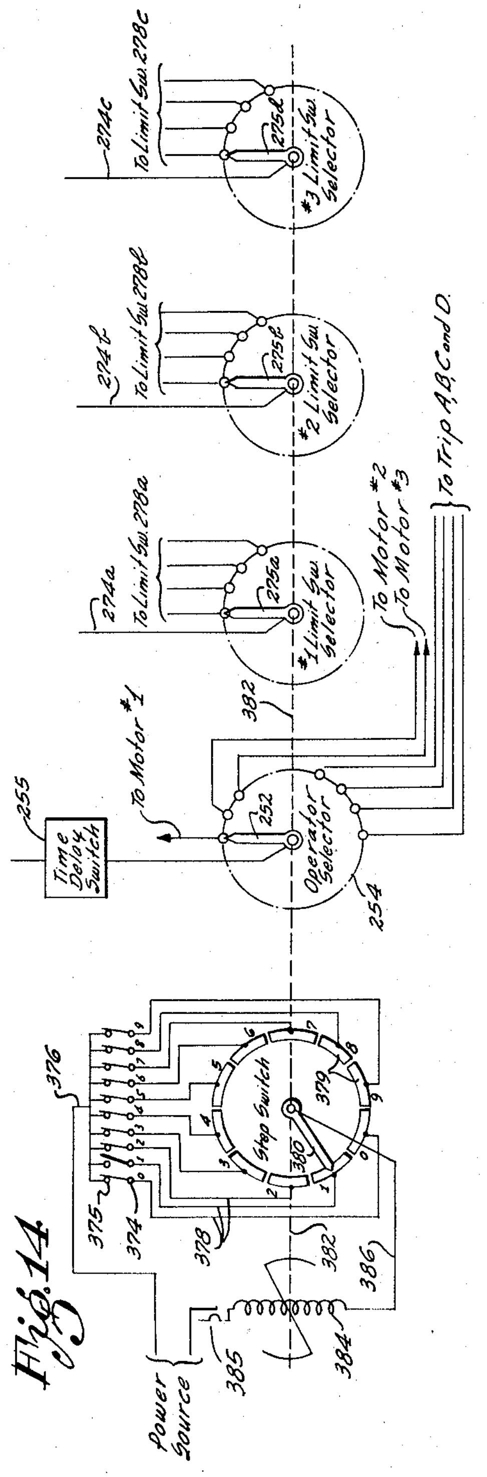

Fig. 7*a* is a perspective view of a cam-type data pin that may be used in some practices of the invention;

Fig. 8 is a fragmentary side elevational view, partly schematic, showing how the first form of the data storage means may be incorporated in a system for automatically programming a television receiver;

Fig. 9 is a wiring diagram of the automatic programming system;

Fig. 10 is a wiring diagram indicating how the data storage means of Figs. 5, 6 and 7 may be used for automatic program control of a television receiver;

Fig. 11 is a fragmentary diagrammatic view of a data storage wheel for use in a system for selective cyclic control of a plurality of operators;

Fig. 12 is a block diagram indicating the general arrangement of the system controlled by the data storage wheel of Fig. 11;

Fig. 13 is a diagram of one of the operator controllers of the control system; and Fig. 14 is a wiring diagram of an operator selector employed in the system.

*Means for data storage*

Figure 1:
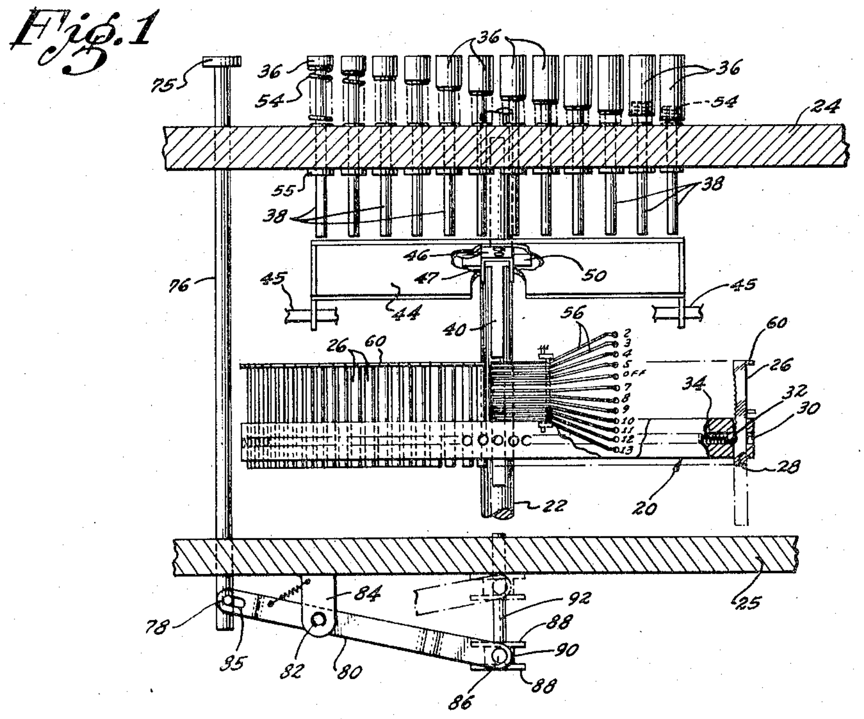
Fig. 1 is a simplified view, partly in elevation and partly in section, showing one embodiment of a data storage wheel together with means for data input and means for erasing stored data.
Figure 4:
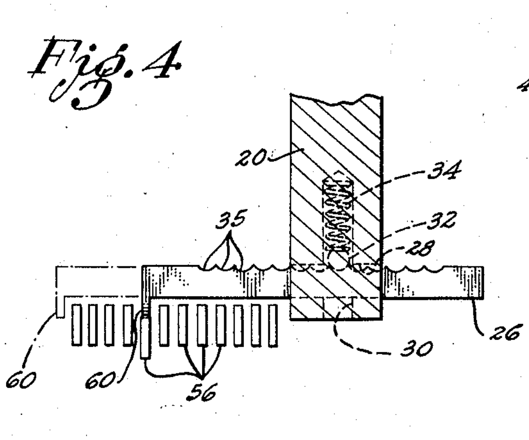
Fig. 4 is a sectional view taken as indicated by the line 4—4 of Fig. 3 and showing how one of the switches responds to a corresponding position of a data pin.

The first embodiment of the data storage means is shown in Figures 1, 4 and 8. Fig. 1 shows a data storage rotor or wheel in the form of a thick disk 20 mounted on a vertical shaft 22 for rotation therewith in a frame structure that includes two spaced frame plates 24 and 25. The data storage wheel 20, which in some uses may be aptly termed a program control means, carries a plurality of data storage elements or pins 26 at a circumferentially spaced series of data storage stations. Each of the data pins 26 is of non-circular cross section and is slidingly mounted in a passage 28 of the same configuration, the pins being positioned traversely of the path along which they are moved by rotation of the storage wheel.

Each of the data pins 26 is axially movable from a retracted position in the corresponding passage 28 through a series of positions representing different data values. Suitable detent means is provided to retain each data pin 26 in each position of its series of positions in a yielding manner. For this purpose, a radial bore 30 in the storage wheel 20 intersects each of the passages 28 to house a small ball 32 and a spring 34 for pressing the ball against the data pin. The data pin has a series of notches or recesses 35 for yielding engagement by the ball 32 at the various positions of the pin including the retracted position.

The data input means for the data storage wheel 20 may comprise any suitable arrangement for selectively shifting the data pins 26 to their various data positions. Fig. 1 shows, for example, how a series of selector buttons 36 on corresponding plungers 38 may operate a setting plunger 40 for shifting the data pins 26 at a data input station adjacent the data storage wheel, the buttons 36 corresponding to the various data positions of a pin.

As best shown in Fig. 8, the setting plunger 40 is mounted in a guide sleeve 42 in a position for alignment with the data pins 26 in sequence as the data storage wheel 20 is rotated. Positioned below the series of plungers 38 is an inclined plate 44 which is hingedly mounted for swinging movement on a cross rod 45. The inclined plate 44 is cut away to straddle the setting plunger 40 and has a small channel member 46 mounted on its under side to provide a pair of side flanges 47 for operating connection with the setting plunger. The two flanges 47 have short slots 48 therein which slidingly receive the opposite ends of a cross pin 50 that is mounted on the setting plunger 40 diametrically thereof. Thus, up-and-down swinging movement of the hinge plate 44 causes corresponding vertical reciprocation of the setting plunger 40. Normally, the setting plunger 40 is in a retracted position, the hinged plate 44 being normally held at an upper position by a suitable coil spring 52.

Each of the plungers 38 carrying a setting or selector button 36 is normally held in an upper retracted position by a coil spring 54 that surrounds the plunger in compression between the button and the upper frame plate 24, the retracted position of the plunger being determined by a stop collar 55 on the plunger that is normally in abutment against the underside of the frame plate 24. As may be seen in Fig. 1, the over-all lengths of the plungers 38 together with their setting buttons 36 are all the same, but the setting buttons are of graduated axial dimension. Since the setting buttons 36 contact the upper frame plate 24 to limit the downward movement of the plungers 38, it is apparent that the plungers are graduated with respect to their lengths of stroke. Thus, the various buttons 36 are effective to push the hinge plate 44 downward to various extents for corresponding movement of the setting plunger 40 against a data pin 26.

Figure 2:
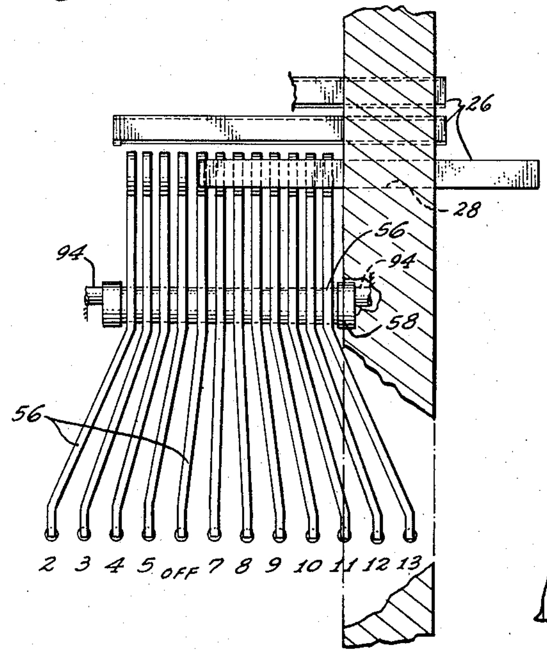
Fig. 2 is a fragmentary front elevational view of a set of switches at a reading station used in the construction shown in Fig. 1.
Figure 3:
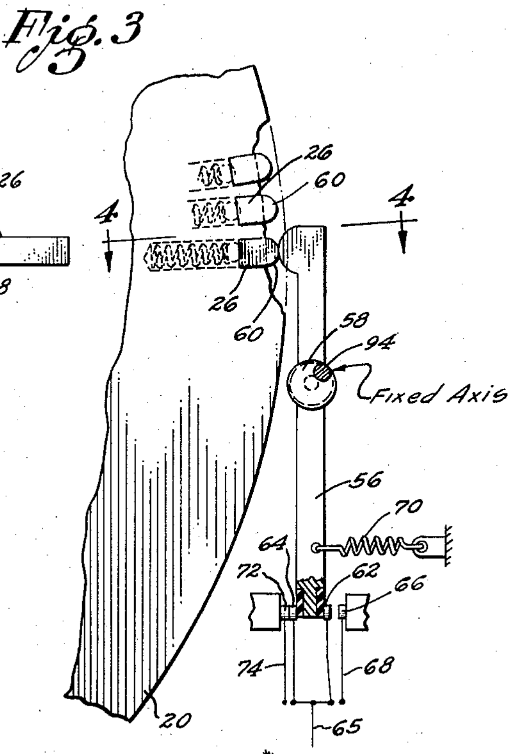
Fig. 3 is an end elevation of the set of switches with portions shown in section.

As best shown in Figs. 2, 3 and 4, a series of switch means is positioned at a reading station in the orbital path of movement of the data pins 26, there being one switch means for each of the data positions of the data pins. Each of the switch means comprises a lever 56, the series of levers being mounted in a row on a fulcrum rod 58. Each of the data pins 26 has an end flange 60 for operating contact with the various switch levers 26. At the normal retracted position of a data pin 26, its end flange 60 lies outside the row of switch levers 56 as shown in broken lines in Fig. 4. At each of the data positions of a data pin, the end flange 60 of the data pin is positioned for abutment against a corresponding switch lever 56 as shown in solid lines in Fig. 4. Thus,, when a data pin 26 is moved into the reading station by rotation of the data storage wheel 20, with the data pin at one of its data positions, the data pin moves against the corresponding switch lever 56 with a wiping action to actuate the switch lever.

The second end of each of the switch levers 26 carries a pair of insulated contacts 62 and 64 (Figure 3), both of which are connected to a common conductor 65. At the normal position of a switch lever 56, the switch lever being out of contact with a data pin, the switch contact 62 is held against a corresponding stationary contact 66 that is connected to a wire 68, the contact 62 being held in this position by virtue of a spring 70 acting on the switch lever. When the switch lever 56 is operated by a data pin 26, however, the switch lever is rotated in opposition to the spring 70 to bring its second contact 64 against a corresponding fixed contact 72, the fixed contact 72 being connected to a wire 74. It is apparent that the contacts 62 and 66 comprise a normally closed switch and the contacts 64 and 72 comprise a normally open switch, and it is further apparent that either of these switches may be used for the purpose of transferring data from the storage wheel 20.

Fig. 1 also shows what may be termed a reset button 75 for erasing data on the data storage wheel 20, the data being erased by restoring the data pin to its retracted position. The reset button 75 is mounted on an operating plunger 76 that is slidingly mounted in the two frame plates 24 and 25. The lower end of the operating plunger 76 carries a cross pin 78 by means of which the plunger is connected to a lever 80. The lever 80, which is mounted by a fulcrum pin 82 on a bracket 84, has a forked end straddling the lower end of the operating plunger 76, the forked end of the lever being provided with slots 85 in sliding engagement with the cross pin 78. The second arm of the lever 80 is also forked and carries a pair of pins 86 for sliding engagement with a pair of flanges 88 on a collar 90 at the lower end of an upwardly extending reset plunger 92. The reset plunger 92 is slidingly mounted in the lower frame plate 25 for movement against a data pin 26 at the reading station for the purpose of shifting the reading pin back to its normal retracted position.

Since the series of switch levers 56 is also at the reading station, means may be provided to shift the series of switch levers clear from the path of the data pins whenever it is desired to shift a data pin along its path of adjustment. For this purpose, the fulcrum rod 58 on which the various switch levers 56 are mounted may be provided with a pair of eccentrically positioned trunnions 94 by means of which it is journaled in suitable bearings. To restore a selected data pin 26 to its retracted position, the data pin is placed at the reading station by rotation of the data storage wheel 20, the fulcrum rod 58 is rotated on its eccentric trunnions 94 to shift the switch levers 56 slightly away from the data storage wheel, and then the reset button 75 is depressed against the upper frame plate 24 to cause the reset plunger 92 to push the data pin back to its retracted position.

*Alternate means for data storage*

The alternate means for data storage shown in Figs. 5, 6 and 7 includes a data storage wheel 20a of the same general construction as the previously described data storage wheel 20. In this instance, the data storage wheel 20a has a series of bores 100 to serve as passage means for slidingly mounting a series of data pins 102. Each data pin 102 is movable in the usual manner from a retracted position through a series of data positions. Each of these positions of the pin is represented by a pin recess in the form of a circumferential groove 104. The usual ball 32 under pressure by a spring 34 in a radial bore 30 serves as detent means for releasable engagement with the various circumferential grooves 104.

At what may be termed a setting station adjacent the data storage wheel 20a, a setting plunger 40a is positioned and operated in the manner heretofore described for the purpose of data input. At the same station, a second reset plunger 92a is provided in the manner heretofore described for the purpose of restoring the data pins to their retracted positions.

At a reading station adjacent the data storage wheel 20a is a suitable sensing means to measure the displacement of a data pin 102 from its retracted position and to generate data signals corresponding to the measurement. In this instance, the sensing or measuring means comprises a bar 105 that is slidingly mounted in a guide groove 106 in a block 108. The slide bar 105 is provided with rack teeth 110 in mesh with a pinion 112, the pinion being on the end of a shaft 114 that is driven by a reversible motor 115. A limit switch 116 to de-energize the motor 115 at a normally retracted reference position of the slide bar 105 is positioned adjacent a limit switch cam 118 on the shaft 114. The limit switch 116 has an operating arm 120 that engages a recess 122 in the cam 118 to stop the motor at the desired position of the slide bar 105.

Also mounted on the shaft 114 of the reversible motor 115 is a rotary actuator 124 for a suitable pulse-generating switch 125. As best shown in Figure 6, the rotary actuator 124 has a circumferential series of recesses 126 separated by teeth 128, the recesses corresponding to different data positions of the pins 102. The pulse-generating switch 125 has a reciprocative operating plunger 130 that is urged upward by concealed spring means and is adapted to respond to only one direction of rotation of the rotary actuator 124, this direction corresponding to the return movement of the slide bar 105 to its normal reference position. For this purpose, the operating plunger has a clevis 132 at its upper end on which is pivotally mounted a short arm 134 carrying a roller 135, the arm being free to rock clockwise from its normal vertical position, as viewed in Fig. 6 to the position shown in broken lines in that figure, but not being free to swing in the opposite direction. Thus, when the rotary actuator 124 rotates counterclockwise for extension of the slide bar 105 towards the data storage wheel 20a, the short arm 134 merely oscillates on the clevis 132 without actuating the operating plunger 130 of the pulse-generating switch. On the return of the slide bar 105, however, the recesses 126 and the intervening teeth 128 of the rotary actuator act on the short arm 134 to reciprocate the operating plunger 130 once for each data position of a data pin that is represented by the range of travel of the slide bar 105.

Any suitable arrangement may be provided for controlling the reversible motor 115 for the purpose of operating the slide bar 105 to measure the displacement of a data pin 102. In the present embodiment of the invention, this purpose is accomplished by means including a reversing switch 136 that is mounted by a bracket 138 on the end of the slide bar 105. The reversing switch 136 has two operating plungers 140 and 142 on its opposite sides for reversing the direction of rotation of the motor 115. Slidingly mounted in the slide bar 105 longitudinally thereof is what may be termed a feeler pin 144 to actuate the operating plunger 140 in response to contact with a data pin 102. Normally, the feeler pin 144 is held in an extended position by a coil spring 145 that is housed in the slide bar and embraces the feeler pin in compression against a collar 145 on the pin. The spring 145 is relatively light and is incapable of causing a data pin 102 to be shifted from one data position to another in the data storage wheel. The second operating plunger 142 of the reversing switch 146 is operated by a block 148 that is adjustably mounted on a fixed rod 150.

To initiate a reading operation at the reading station, it is necessary merely to close the circuit of the motor 115 momentarily to cause the limit switch 116 to be closed by rotation of the cam recess 122 away from the switch arm 120. The motor then continues to rotate counterclockwise, as viewed in Fig. 5 to advance the slide bar 105 towards the particular data pin 102 that is at the reading station. When the feeler pin 144 makes contact with the end of the data pin 102, the consequent retraction of the feeler pin in opposition to the spring 145 actuates the plunger 140 of the reversing switch 136 to reverse the motor. The slide bar 105 is then retracted until the cam recess 122 returns to its normal position, and thereby opens the limit switch 116. At the same time that the limit switch 116 opens, the return movement of the reversing switch 136 causes the second operating plunger 142 of the reversing switch to be actuated by the fixed block 148 to reverse the motor circuit in preparation for the next reading cycle.

A third form of the data pin that may be used in some practices of the invention is shown in perspective in Figure 7*a*. The data pin comprises what may be termed a cam body 420 mounted eccentrically on elongated trunnions 422. The trunnions 422 are both rotatably and slidably mounted in a pair of spaced bearings 424 that permit a liberal range of longitudinal movement of the data pin.

At the reading station, a switch lever 425 mounted on a pivot pin 426 has one arm in contact with the periphery of the cam body 420 and has a contact 428 on its second arm which moves selectively across an arcuate series of contacts 430. Thus the cam body 420 may be rotated to a position representing a given data value and when the cam body is carried to the reading station, its impingement upon the switch lever 425 will position the switch lever contact 428 at the particular contact 430 that represents the given value, the two contacts cooperating to close a circuit representing the given value.

A feature of the data pin shown in Figure 7*a* is that it may be used to store two different data values, one data value being represented by the rotary position of the cam body 420 and the other data value being represented independently by the longitudinal position of one of the trunnions 422. Thus, one of the trunnions 422 may be provided with recesses in the form of circumferential grooves 104, as heretofore described, for engagement by suitable yielding detent means. The second data value is stored by shifting the data pin of Figure 7*a* longitudinally to a position representing the second data value and this second data value is detected at the reading station by the mechanism including the slide bar 105 shown in Figure 5, as described heretofore.

*Automatic program control for a television receiver by the first means for data storage*

Figures 8 and 9 indicate how the first described data storage wheel 20 and the associated mechanism including the set of reading switch levers 56 may be employed for automatically programming a television receiver.

The data storage wheel 20 carrying the previously described data element pins 26 is keyed to a shaft 152 that carries a time dial 154 and a knurled knob 155 integral therewith. The time dial 154 has a total of ninety-six scale marks 156 thereon representing one-quarter hours over a twenty-four hour period. A fixed index 158 indicates the current time or the current one-quarter hour interval, this index being on the upper surface of the upper frame plate 24.

The usual set of setting or data input buttons 36 on plungers 38 and the usual reset button 75 on the plunger 76 (Figure 1) are also mounted in the upper frame plate 24 as heretofore described. In addition, a clutch button 160 on a plunger 162 is mounted in the upper frame plate 24 to actuate a clutch pin 164 that normally releasably connects the data storage wheel 20 with a suitable clock mechanism. In this instance instead of connecting the data storage wheel 20 directly to a clock mechanism for constant slow rotation, the storage wheel is connected to a clock-controlled step advance mechanism 165 that operates at one-quarter hour intervals.

The plunger 162 is connected by a link 166 with one arm of a lever 168 that is mounted on a fixed fulcrum pin 170. The second arm of the lever 168 is forked to press against a flange 172 of a collar 173 that is slidingly and rotatably mounted on the storage data wheel shaft 152. The collar 173 has a pair of flanges 174 engaging a forked arm of a lever 175 that is fulcrumed on a pin 176 carried by a pair of ears 178 on the upper side of the storage data wheel 20. A suitable compression spring 180 normally retains the collar 173 in the elevated position shown in Figure 8. The second arm of the lever 175 controls the clutch pin 164, and, for this purpose, is connected to a collar 182 on the upper end of the clutch pin. The step advance mechanism 165 actuates a clutch disc 185 that is rotatably mounted on the lower end of the shaft 152, this clutch disc having a single bore 186 to receive the clutch pin 164.

It is apparent that, by virtue of the spring 180, the clutch pin 164 is normally engaged with the bore 186 in the clutch disc 185 to connect the step advance mechanism 165 with the data storage wheel 20 and also with the time dial 154. The clutch button 160 may be raised to cause the collar 173 to depress the lever 175 for disengaging the clutch pin 164, thereby to permit the data storage wheel 20 and the time dial 154 to be freely rotated to bring the different data pins 26 selectively to the station where the pins may be set or restored, which station is also the reading station as heretofore explained. Preferably, suitable detent means is provided to keep the clutch disengaged without requiring the operator to hold the clutch button 160 in its upper position. For this purpose, a detent ball 190, concealed in the upper frame plate 24, is pressed by a spring 191 into contact with the plunger 162, the plunger having suitably positioned detent recesses to releasably seat the detent ball.

The step advance mechanism 165 is energized every quarter-hour by a pulse of current from a clock motor 192 (Figure 9) to cause the timing dial 154 to be advanced by one quarter-hour mark, and to cause the data storage wheel 20 to be advanced by the same amount to bring the next succeeding data pin 26 to the reading station. It is apparent that the various data pins 26 may be set in advance by disengaging the clutch and bringing the different data pins to the reading station for data input by the setting buttons 36, the time dial showing the quarter-hours corresponding to the different data pins.

Since a conventional television receiver is designed to tune in on twelve channels, Nos. 2 to 13 inclusive, there are twelve of the previously described switch levers 56 at the reading station. Since in any one locality at least one channel is not used, one of the twelve switch levers 56 may be employed to turn off the television set. In this instance, the switch lever 56 representing channel 6 is used for this purpose. Thus, as indicated in Figs. 1 and 2, the first four switch levers 56 represent television channels, Nos. 2 to 5 inclusive, the sixth switch lever represents the de-energized state of the television receiver, and the rest of the switch levers represent channels 7 to 13. There are twelve corresponding data input buttons 36 which in this instance are channel selector buttons. Each of the data pins 26 has a series of thirteen detent recesses 35 (Figure 4) since each data pin has a retracted position in addition to the twelve positions corresponding to the twelve switch levers 56 and the twelve channel selector buttons.

Either the pairs of contacts 62 and 66 or the pairs of contacts 64 and 72 on the various switch levers 56 may be utilized to control a suitable actuating means for the usual channel selector knob of the television receiver. In other words, a selected switch of a series of normally open switches may be closed to cause the television receiver to tune in on a selected channel, or a selected switch among a series of normally closed switches may be opened for the same purpose. In this instance, the normally closed pairs of contacts 62 and 66 are opened selectively to actuate the channel selector knob of the television receiver and the normally open pairs of contacts 64 and 72 are used to energize a corresponding series of pilot or indicator lamps 194.

In this particular embodiment of the invention, the means for actuating the channel selector on the television receiver comprises a suitable motor 195 that operates a shaft 196, the shaft being indicated by a broken line in Figure 9. The shaft 196 is directly connected to the usual channel selector shaft on the television receiver, and the shaft also carries two wiper arms 198 and 200 for rotation synchronously with the channel selector on the television receiver. The rotary wiper arm 198 traverses a circular series of twelve equally spaced contacts 202 which correspond to the set of twelve switch contacts 66 and are connected thereto by the previously mentioned wires 68. The other wiper arm 200 traverses a circular contact 204 that has a gap 205 between its two ends, the gap corresponding in position to the "Off" contact 202 representing channel six. The circular contact 204 is connected to one side of the circuit that energizes the television receiver, and the wiper arm 200 is connected to the other side. Thus, the television receiver is "On" when the wiper arm 200 is at any of its twelve positions except the position corresponding to channel six.

The particular control system employed in this embodiment of the invention includes what may be termed a sensing switch 206 (Figure 8) that is normally open and is positioned at the reading station to be closed by whatever data pin 26 is at the reading station if the data pin has been shifted out of its retracted position to a position representing one of the television channels. The operating member of the normally open sensing switch 206 carries a roller 208 for contact with the extended data pins 26 as the data pins move successively to the reading station. The control system also includes what may be termed a synchronizing pulse switch 210 (Figure 9) which, as indicated by the broken line 211, is operated by the clock motor 192 and is closed for a time period on the order of one second whenever the clock motor causes an actuation of the step advance mechanism 165 to be completed.

In the wiring diagram in Figure 9, one lead 212 from the power source is connected to each of the indicator lamps or pilot lights 194 and is connected by a wire 214 to one side each of the clock motor 192, the step advance mechanism 165, the synchronizing pulse switch 210 and one contact of a normally open relay 216. The second lead from the power source is the previously mentioned wire 65 that is connected to the contacts 62 and 64 on the various switch levers 56. This second lead 65 is also connected to the second side of the clock motor 192. The synchronizing pulse switch 210 and the previously mentioned sensing switch 206 are connected in series with a wire 215 to one side of the channel selector motor 195 and the second contact of the relay 216 is connected to the same wire. The second side of the channel selector motor 195 is connected to the wiper arm 198 by a wire 218 and the coil of the normally open relay 216 is connected across the two wires 218 and 215 in parallel with the channel selector motor 195.

With the step advance mechanism 165 operated by the clock motor 192 at each quarter-hour, the index 158 is always at the present clock time quarter-hour on the scale 156 of the dial 154. Whenever it is desired to set up an automatic program for the television receiver, the clutch button 160 is raised to release the time dial 154 together with the data storage wheel 20 for free rotation by the knob 155. If the current time is 6:20 o'clock, for example, the dial may be positioned relative to the index 158 to indicate the beginning of the next quarter-hour, 6:30, thereby placing the corresponding data pin 26 in register with the setting plunger 40 and the resetting plunger 92. The reset button 75 is then depressed to make sure that the data pin 26 is restored to its starting position, and then one of the program selector buttons 36 is depressed in accord with the television program desired at 6:30, the data pin 26 being shifted to the corresponding position by the setting plunger 40. If the 6:30 television program is a half-hour program, the 6:45 data pin may be left in its retracted position since no change in the program will occur if the sensing switch 206 is not operated. If no program is selected for 7:00 o'clock and for 7:15, the same procedure will be followed at each of these positions of the time dial 154, but the selector button for channel 6 will be depressed to cause the television receiver to be turned off during this one-half hour interval. In this manner, a program may be coded into the data storage wheel 20 for each quarter-hour of the next twenty-four period. Then the time dial 154 is again positioned at the index 158 to indicate the current quarter-hour by clock time and the clutch is again engaged.

When the data storage wheel 20, along with the time dial 154, is advanced one step to position the next succeeding data pin 26 at the reading station, the movement of the data pin into the reading station causes the corresponding switch lever 56 to be operated to open the corresponding pair of contacts 62 and 66 and to close the corresponding pair of contacts 64 and 72. If the data pin has been shifted to its position that corresponds to channel 9, for example, all of the twelve contacts 202 associated with the wiper arm 198 except the contact for channel 9 will be connected to the lead 65 from the power source as indicated in Figure 9. If the wiper arm 198 is not on the de-energized contact 202 that represents channel 9, the channel selector motor 195 is energized through the following circuit: lead 65 from the power source, the pair of contacts 62 and 66 corresponding to the instant position of the wiper arm 198, the corresponding wire 68, the corresponding contact 202, the wiper arm 198, wire 218 to one side of the channel selector motor, wire 215, sensing switch 206, synchronizing pulse switch 210, wire 214, and lead 212 to the power source.

The sensing switch 206 is closed by the arrival of the data pin 26 to the reading station and the synchronizing pulse switch 210 is closed for approximately one second by the clock motor 192 at the same time. The momentary closing of the described circuit for the channel selector motor 195 by the brief operation of the synchronizing pulse switch 210 results in energization of the relay 216 to close the alternate motor circuit through the relay, and, since the relay coil is in parallel with the channel selector motor, the relay holds the motor circuit closed. It is apparent that the channel selector motor 195 continues to rotate until the wiper arm 198 reaches the selected contact 202 corresponding to the selected channel 9, whereupon the motor circuit is broken since the corresponding pair of contacts 62 and 66 is open. At the same time, the corresponding pair of contacts 64 and 72 is closed to energize the indicator lamp 194 that designates channel 9. When the motor circuit is opened by the arrival of the switch arm 198 at the selected de-energized contact 202, the circuit through the holding relay 216 is opened to restore the relay to its normal open state.

If the same channel has been selected for the next quarter-hour either the next pin will be left in its retracted position or will be at a data position representing the same channel. In the first instance, the channel will not be changed because the sensing switch will not be operated. In the second instance, the channel selector motor will not be energized by the arrival of the next data pin 26 at the reading station because the same pair of contacts 62 and 66 will be held open by the next data pin. If the channel 6 is selected for any quarter-hour, the channel selector motor 195 operates in the described manner to position the wiper arm 198 at the corresponding contact 202, and thus causes the wiper arm 200 to be positioned at the gap between the two ends of the circular contact 204, this positioning of the wiper arm 200 resulting in opening of the circuit that energizes the television receiver.

If desired, delay means can be included in the apparatus described above so as to cover the situation where the wiper arms 198 and 200 move quickly past the contacts corresponding to channel 6 and stop at contacts corresponding to one of the channels in the television receiver. These delay means would prevent the television receiver from being turned off momentarily during every quarter-hour shift in stations except when channel 6 is specifically selected.

*Television program control by the alternate means for data storage*

If the alternate form of data storage wheel 20*a* shown in Figures 5, 6 and 7 is to be used for automatic program control of a television receiver, the data storage wheel may be combined with other components for this purpose in the manner indicated by the wiring diagram in Figure 10.

The arrangement shown in Figure 10 includes the previously mentioned reversible motor 115 and the pulse-generating switch 125 operated thereby. A sensing switch 220 (Figure 5) is positioned adjacent the memory storage wheel 20*a* to be operated by the successive data pins 102 in the same manner as the previously described sensing switch 206. As shown in Figure 10, the arrangement includes two synchronizing pulse switches 210*a* and 210*b* that are operated momentarily by the previously mentioned clock motor 192 every quarter-hour in the same manner as the previously described synchronizing pulse switch 210.

The channel selector of the television receiver is actuated by a rotary solenoid of a well known type that is represented by the coil 222 in Figure 10. The rotary solenoid 222 has an actuating shaft represented by the broken line 224 which is directly connected to the channel selector of the television receiver, the rotary solenoid rotating the shaft 224 step-by-step to shift from one channel to another in the sequence of twelve channels. The shaft 224 carries a wiper arm 225 which cooperates with a circular contact 226 that has a gap 228 representing a homing station for the rotary solenoid 222. This homing station may be one of the channels that is not used in the local television area, channel 12, for example, and corresponds to the retracted positions of the various data pins 102.

The shaft 224 of the rotary solenoid 222 carries a second wiper arm 230 which determines whether or not the television receiver is energized. The wiper arm 230 cooperates with a circular contact 232 having a gap 234 therein that corresponds to channel 6, as heretofore explained. Thus, the wiper arm 230 and the cooperating circular contact 232 serve as a switch for the television receiver.

The rotary solenoid 222 is of a well known type which will advance one step in one direction in response to the flow of current, but has an auxiliary circuit together with a built-in pulsing switch, which auxiliary circuit may be energized to cause the rotary solenoid to make a series of the steps in rapid succession.

As shown in Figure 10, one lead 235 from the power source is connected to one side of the motor 115 and is connected by a wire 236 with one side each of the pulse-generating switch 125 and the synchronizing pulse switch 210*b*. The second side of the pulse-generating switch 125 is connected to one side of the rotary solenoid 222 by a wire 238, and the second side of the synchronizing pulse switch 210*b* is connected to the wiper arm 225 by a wire 240. The same side of the rotary solenoid 222 is connected to the circular contact 226 through the built-in pulsing switch 242 of the rotary solenoid. The second side of the rotary solenoid 222 is connected to a second lead 244 from the power source.

The synchronizing pulse switch 210*a* and the sensing switch 220 are connected in series and these two switches are in parallel with the previously mentioned limit switch 116 of Figure 5 for controlling energization of the motor 115. The two field coils 245 and 246 of the reversible motor 115 are connected through the previously described reversing switch 136 to the lead 244.

To set up a program for automatic operation of the television receiver, the data storage wheel 20*a*, together with the associated time dial 154, is de-clutched for rotation independent of the associated step advance mechanism, and the data pins 102, corresponding to the different stages of the proposed automatic cycle, are brought in succession into register with the reset plunger 92*a* and the setting plunger 40*a* for the desired data input to position the data pins 102 in accord with the selected television channels. If there is no change in the channel for a particular quarter-hour the corresponding data pin may be left in its retracted position. Since the plungers 92*a* and 40*a* are at a station spaced away from the reading station represented by the slide bar 105, a special index (not shown) in addition to the index 158 is required, the time dial 154 being positioned relative to this second resetting index for placing the corresponding data pins 102 at the station for restoring and setting the pins. After all of the data pins 102 have been positioned in accord with the desired sequence of television channels, the clutch is re-engaged with the time dial 154 positioned at the previously mentioned index 158 in accord with the current clock time quarter-hour.

When the clock motor energizes the step advance mechanism to advance the data storage wheel 20*a*, the two synchronizing pulse switches 210*a* and 210*b* are closed momentarily. The closing of the synchronizing pulse switch 210*b* is of sufficient duration to cause the built-in pulsing switch 242 to operate as many times in succession as required to turn the rotary solenoid 222 to "home" from whatever position has assumed by the positioning of the previous data pin 102. The circuit for homing the rotary solenoid 222 is as follows: lead 235, wire 236, synchronizing pulse switch 210*b*, wire 240, wiper arm 225, circular contact 226, and built-in pulsing switch 242 to one side of the rotary solenoid, the other side of the rotary solenoid being connected to the second lead 244. The closing of this circuit causes the rotary solenoid 222 to be actuated rapidly step-by-step until the wiper arm 225 is positioned at the gap 228 between the ends of the contact ring 226. This position of the rotary solenoid shaft 224 corresponds to the retracted position of a data pin 102 which is the reference position from which displacements of the pin are measured by the action of the previously described slide bar 105. (Figure 5.)

The arrival of a new data pin 102 at the reading station causes the sensing switch 220 to be closed if the data pin has been shifted from its retracted position. The synchronizing pulse switch 210*a* is closed momentarily by the clock motor to cooperate with the sensing switch 220 to complete the following circuit for the reversible motor 115: lead 235 to one side of the motor 115, the synchronizing pulse switch 210*a* and the sensing switch 220 to the field coil 245 for rotating the motor 115 in the direction to move the slide bar 105 outward, and the right switch arm of the previously mentioned reversing switch 136 to the second lead 244. The duration of the closing of the synchronizing pulse switch 210*a* is sufficient to cause the limit switch 116 to be closed for continued energization of the motor circuit after the synchronizing pulse switch opens. When the feeler 144 (Figure 5) is advanced to the end of the data pin 102 at the reading station, it is retracted to cause actuation of the reversing switch 136, whereupon the right switch arm of the reversing switch opens and the left switch arm closes for reverse rotation of the motor by energization of the second field coil 246. The reverse rotation of the motor 115 to shift the slide bar 105 leftward as viewed in Figure 5 terminates when the limit switch 116 again opens at the starting position of the slide bar. Simultaneously, the reversing switch 136 is actuated to open its left switch arm and to restore its right switch arm to its normal closed position shown in Fig. 10.

During the rightward or outward movement of the slide bar 105, the pulse-generating switch 125 remains inoperative. On the return movement of the slide bar, however, the pulse-generating switch 125 is closed a number of times in accord with the displacement of the data pin 102 from its retracted reference position. The pulse-generating switch 125 creates pulses to cause the rotary solenoid 222 to advance one step for each pulse. The circuit through the rotary solenoid 222 at this time is as follows: lead 235, wire 236, pulse-generating switch 125, and wire 238 to one side of the rotary solenoid, the other side of the rotary solenoid being connected to the second lead 244. As a result, the rotary solenoid 222 rotates the shaft 224 to the position corresponding to the television channel represented by the setting of the pin 102. If the pin 102 is at the position representing channel 6, the rotary solenoid shaft 224 stops at the position placing the wiper arm 230 at the gap 234 in the circular contact 232 and the television receiver is de-energized.

*Selective cyclic control of a plurality of operators*

Figures 11 to 14 indicate by way of example how a data storage wheel of the character described may be employed to control an operating cycle of an automatic screw machine. The operators of a typical automatic screw machine may comprise a turret slide, a back-cross slide, a front-cross slide, and a number of trips including a forward-reverse trip, a deflector trip, a turret index trip, and a stock-feed trip. The means for actuating these various components of the screw machine may comprise three motors Nos. 1–3 for the three slides respectively, and four solenoids A—D for the four trips. It will be readily appreciated by those skilled in the art that various other types of operators may be utilized in such a system, including pneumatic operators and hydraulic operators.

The data storage wheel for this control system may take the form of the data storage wheel 20b in Figure 11, which has five concentric rows of data pins so that each step advance of the data storage wheel positions five data pins 26a—26e at the reading station. The data pins 26a—26d correspond to digits in a decimal system for designating positions of the three slides of the screw machines and the fifth data pin 26e determines which of the seven actuators, the three motors and the four trip solenoids are energized at the different stages in the predetermined cycle of operations.

Figure 12 is a block diagram of the control system. At each station in the step-by-step positioning of the data storage wheel 20b, the four data pins 26a—26d may adjust or "set" a digital controller for a corresponding actuating motor. The digital controllers for the three slide-actuating motors are designated 250a—250c. To keep the wiring simple and to eliminate unnecessary switches, all of the digital controllers may be connected in parallel to respond simultaneously to the data pins 26a—26d at the reading station, since only one of the slide-actuating motors is energized at a time.

The fifth data pin 26e controls the position of the wiper arm 252 of an operator selector 254. The operator selector 254 has a circularly arranged series of contacts which are connected to the corresponding actuators of the system. Thus, each of the actuators comprising the three motors and four trips is energized through a circuit including the wiper arm 252 and the corresponding contact of the operator selector 254. A time delay switch 255 is in series with the wiper arm 252 to delay energization of a motor until the corresponding digital controller 250a—250c has been set or adjusted by the four data pins 26a—26d at the reading station.

Figure 12 shows the wiper arm 252 positioned at the contact corresponding to the No. 1 slide-actuating motor. The motor is energized through the following circuit: lead 256 from a power source, time delay switch 255, wiper arm 252, wire 258 to one side of the motor through the coil 260a of a clutch-and-brake assembly 262a, field coil 264 for rotating the motor No. 1 in one direction, the left switch arm of a delay reversing switch 265a, wire 266 to the digital controller 250a and wire 268 from the digital controller to a second lead 270 from the power source.

The digital controller 250a serves as a limit switch for stopping the No. 1 motor at the required position of the corresponding screw machine slide, and also automatically slows down the motor as the motor reaches the predetermined position represented by the setting of the digital controller. When the screw machine slide controlled by motor No. 1 reaches the desired position to terminate the first operation in the cycle, the digital controller 250a de-energizes the motor. The simultaneous de-energization of the coil 260a of the clutch-and-brake assembly 262a causes disengagement of the clutch that connects the No. 1 motor with the corresponding screw machine slide and simultaneously causes application of a brake to immobilize the slide.

At the same time that the digital controller 250a de-energizes the No. 1 motor, it energizes the corresponding delayed reversing switch 265a which is in parallel with the motor No. 1, and, after a time delay, the reversing switch opens its left arm and closes its right arm. Closing the right arm of the reversing switch 265a completes the following circuit for reverse rotation of the motor to restore the screw machine slide to a predetermined starting position: lead 256 from the power source, time delay switch 255, wiper arm 252, coil 260a of the clutch-and-brake assembly 262a to one side of the motor, the second field coil 272 for reverse rotation of the motor, the right arm of the delayed reversing switch, a wire 274a to a wiper arm 275a that is on the same shaft (broken line 276) as the wiper arm 252, a contact among a circular set of contacts associated with the wiper arm 275a, a limit switch in a set of limit switches 278a corresponding to the position of the wiper arm 275a, and a wire 280a to the second lead 270 from the power source.

The No. 1 motor continues to rotate in the reverse direction until the slide that is operated by the motor reaches a position to open the corresponding limit switch 278a whereupon the motor is de-energized. The flow of current through the wire 280a readies a pulse switch 282a, and, when current ceases to flow through the wire 280a at the completion of the operation of the screw machine slide, the pulse switch 282a sends a pulse to the step advance mechanism for automatic advancement of the data storage wheel 20b to bring a new set of data pins 26a—26d to the reading station. Various types of pulse switches may be used. One type of pulse switch may use a capacitance which is charged during the flow of current through the wire 280a and which is discharged when the current through the wire is interrupted.

The arrival of the new set of pins 26a—26d results in a new setting of all the motor controllers 250a—250c and the arrival of the new pin 26e at the reading station results in actuation of the operator selector 254 to position the wiper arm 252 for energizing the operator for the next stage in the operating cycle. If the next stage in the operating cycle is carried out by the motor No. 2, the motor will operate in a cycle in the manner described, the cycle being terminated by a switch in a set of limit switches 278b as determined by the position of a wiper arm 275b, the reverse rotation of motor No. 2 being initiated by a delayed reversing switch 265b. When motor No. 2 is de-energized, the corresponding pulse switch 282b momentarily energizes the step advance mechanism to bring the next succeeding set of data pins 26a—26e to the reading station. Motor No. 3 is operable through a cycle in the same manner.

Each of the four trip solenoids A—D is operated independently by the wiper arm 252 of the operator selector 254. Whenever one of the trip solenoids is de-energized it causes a pulse switch 283 to operate the step advance mechanism.

Each of the data pins 26a—26d is movable through a series of ten positions for the purpose of decimal system enumeration and there are sets of ten each of the switch levers 56a—56b at the reading station.

Each of the three digital controllers 250a—250c has a set of four stator-rotor digital units, as may be seen in Figure 13, which shows the components of the digital controller 250a for motor No. 1. The four stator-rotor digital units 284a—284d correspond respectively to the data pins 26a—26d and constitute, in effect, a digital-analog converter that translates the settings of the four data pins 26a—26d into positions of rotation of a shaft 285. This shaft 285 may, for example, operate a lead screw 286 for controlling the turret slide 288 of the screw machine.

Motor No. 1 is connected to a countershaft 290 which, in turn, is connected to the slide-controlling shaft 285 by ten-to-one gearing comprising a relatively small gear 291 on shaft 290 and a larger gear 292 on shaft 285. The motor connection with the countershaft 290 is through suitable reduction gearing in a gear box 293 and through a clutch 294a which is part of the previously mentioned clutch-and-brake assembly 262a. Also included in the clutch and brake assembly 262a is a brake 295a for the shaft 285.

The counter shaft 290 carries the wiper arm 298a of the digital unit 284a and is connected by ten-to-one reduction gearing 300 with the wiper arm 298b of the second digital unit 284b. The wiper arm 298b is on a shaft 302 that is connected by reduction gearing 304 with a shaft 305 that carries the wiper arm 298c of the digital unit 284c. Finally, the shaft 305 is connected by reduction gearing 306 with a shaft 308 that carries the wiper arm 298d of the fourth stator-rotor digital unit 284d.

It is apparent that with the four wipers 298a—298d operatively connected with the lead screw 286, and with the lead screw having a thread pitch of ten to the inch, the four wiper arms may represent the different positions of the slide 288 by increments of .001 of an inch, the wiper arm 298d being positioned at one of ten associated contacts representing unit inches, the wiper arm 298c being positioned at one of ten associated contacts representing tenths of inches, the wiper arm 298b being positioned at one of ten associated contacts representing hundredths of an inch, and the wiper arm 298a being positioned at one of ten associated contacts representing thousandths of an inch.

As shown in Figure 11 each of the switch levers 56 of the set of ten switch levers at the reading station for each of the data pins 26a—26d is provided with the usual biasing spring 70 and carries a contact 310 for cooperation with a corresponding stationary contact 312. Each pair of contacts 310 and 312 is normally open; i. e., when the corresponding switch lever 56 is not operated by a corresponding data pin 26a—26d. When the switch levers 56a—56d are operated by the corresponding data pins 26a—26d, the pairs of switch contacts 310 and 312 close together as shown in Figure 11. In Figure 13, the same contacts 310a—310d and the same contacts 312a—312d are paired and depicted diagrammatically as constituting normally open switches, one switch in each set of ten being closed in accord with the setting of the corresponding data pin 26a—26d.

As indicated in Figure 13, all of the contacts 310d are connected to a lead 314 from a relatively low amperage power source. The corresponding fixed contacts 312d are connected by corresponding wires 315 with the ten stator contacts of the digital units 284d of each of the three digital controllers 250a—250c, the digital units being connected in parallel. The wiper arm 298d of the digital unit 284d is connected by a wire 316 to one side of the coil a relay 318 and the second side of the relay coil is connected by a wire 320 to the ten contacts 310c at the data storage wheel 20b. The corresponding stationary contacts 312c are connected by wires 322 with the stator contacts of the digital unit 284c.

The wiper arm 298c of the digital unit 284c is connected by a wire 224 with one side of the coil of a relay 325, and the second side of the relay coil is connected by a wire 326 with the ten contacts 310b at the data storage wheel 20b. The corresponding ten contacts 312b are connected by wires 328 to the ten stator contacts of the digital unit 284b.

The wiper arm 298b of the digital unit 284b is connected by a wire 330 to one side of the coil of a relay 332 and the second side of the relay coil is connected by a wire 334 with the contacts 310a at the data storage wheel 20b. The corresponding set of ten contacts 312a are connected by wires 335 with the ten stator contacts of the digital unit 284a. The wiper arm 298a of the digital unit 284a is connected by a wire 336 to ground to complete a low amperage control circuit that includes the wiper arms of all four digital units 284a—284d. The wire 224 is connected to ground through a resistor 338 and the wire 330 is also connected to ground through a resistor 340, thus dividing the control circuit into three portions in parallel.

Assuming that the starting position of the turret slide 288 is at a position having a lower numerical value than the positions represented by the selected stator contacts of the four digital units of the digital selector for motor No. 1 represented by Figure 13, the closing of the motor circuit by the corresponding operator selector 254 will cause rotation of the four wiper arms 298a—298d towards the positions of the selected stator contacts. When the rotation of the lead screw 286 by the motor No. 1 brings the wiper arm 298d to the selected stator contact of the digital unit 284d, nothing happens in the low amperarge control circuit, but when the wiper arm 298c reaches the selected contact of the digital unit 284c, the first portion of the low amperage control circuit is closed as follows: wire 314 from the low amperage power source, contacts 310d and 312d, a wire 315 to the selected contact of the digital unit 284d, wiper arm 298d, wire 316, the coil of relay 318, wire 320 to contacts 310c, a wire 322 to the selected contact of the digital unit 284c, wiper arm 298c, wire 224, and resistor 338 to ground. The energization of this portion of the low amperage control circuit energizes the relay 318.

When the third wiper arm 298d subsequently reaches the selected contact of the digital unit 284b, the second portion of the low amperage control circuit is energized as follows: wire 224, coil of relay 325, wire 326, contacts 310b, a wire 328 to the selected contact of the digital unit 284b, wiper arm 298b, wire 330 and resistor 340 to ground. The energization of this second portion of the low amperage control circuit energizes relay 325.

Finally, when the continued rotation of the lead screw 286 by motor No. 1 causes the wiper arm 298a to reach the selected contact of the digital unit 284a, the final portion of the low amperage control circuit is energized as follows: wire 330, coil of relay 332, wire 334, contacts 310a, a wire 335 to the selected contact of the digital unit 284a, wiper arm 298a, and wire 336 to ground. The energization of this third portion of the low amperage control circuit energizes the relay 332.

The relay 318 has a normally closed contactor 342 and the relay 325 has a normally closed contactor 344. The relay 332 has a normally closed contactor 346 and a second normally open contact 348.

The previously mentioned wire 266 (Figure 12) from the left arm of the delayed reversing switch 265a is connected to one side of the normally closed contactor 342 of the relay 318 and the second side of the contactor is connected by a wire 356 to one side of the normally closed contactor 344 of the relay 325, the second side of the contactor 344 is connected by a wire 358 with one side of the normally closed contactor 346 of the relay 332, and the second side of the contactor 346 is connected to the previously mentioned wire 268 (Figure 12) to the power source. One side of the normally open contactor 348 of the relay 332 is connected to the same wire 268 and the second side of the contactor is connected by a wire 364 with the previously mentioned delayed reversing switch 265a (see also Figure 12) which shunts the motor No. 1. The second side of the delayed reversing switch is connected by a wire 365 with the wire 258 on the other side of the motor. A resistor 366 shunts the normally closed contactor 342 of the relay 318 and a second resistor 368 shunts the normally closed contactor 344 of the relay 325.

When the low amperage control circuit is partially completed by the wiper arms 298d and 298c, the consequent energization of the relay 318 opens the contactor 342. The opening of the contactor 342 places the resistor 366 in the motor circuit to reduce the speed of operation of motor No. 1. Later, the completion of the next portion of the low amperage control circuit by the wiper arm 298b energizes the relay 325 to open the normally closed contactor 344. The opening of the contactor 344 places the second resistor 368 in series with the resistor 366 in the motor circuit to slow the motor down to a creeping pace. Finally, the wiper arm 298a completes the rest of the low amperage control circuit to energize the relay 332 with consequent opening of the contactor 346 to break the motor circuit and with consequent closing of the contactor 348 to energize the delayed reversing switch 265a.

The de-energization of the coil 260a of the clutch-and-brake assembly 262a causes the lead screw 286 to be disconnected from the motor and causes the brake 292a to immediately immobilize the lead screw. After a short time delay, the reversing switch 265a operates to close its right arm to complete a motor circuit through the reverse field coil 272 and the wire 274a that leads through the wiper arm 275a (Figure 12) to the selected limit switch in the set of limit switches 278a.

As shown at the top of Figure 13, the various limit switches 278a may be mounted in a slidable and adjustable manner on a support bar 370 for cooperation with a switch-actuating finger 372 on the screw machine slide 288. The various limit switches 278a are of the same construction as the previously described pulse-generating switch 125, each limit switch having a hinged operating member so that it responds only to the return movement of the screw machine slide 288. When the finger 372 reaches the selected limit switch 278a, corresponding to the desired starting position of the slide arm 275a, the limit switch opens to stop the return movement of the slide. Thus, the described arrangement makes it unnecessary to return the slide 288 to a fixed starting position.

The fifth data pin 26e at each of the stations on the data storage wheel 20b that controls the operator selector 254 operates a set of ten switch levers 56e (Figure 11). Each of the switch levers 56e carries a contact 374 which is paired with a corresponding fixed contact 375. These pairs of contacts are normally closed, but are opened in response to operation of the switch lever by a data pin 26e.

Figure 14 shows the contacts 374 and 375 paired diagrammatically as switches with the No. 1 switch open. All of the contacts 375 are connected to a power source by a wire 376 and the contacts 374 are connected by wires 378 with ten corresponding contacts 379 associated with a wiper arm 380. The wiper arm 380 is on a shaft indicated by the broken line 382 that is operated in a step-by-step manner by a self-pulsing rotary solenoid represented by a coil 384, the solenoid including a built-in pulsing switch 385. The wiper arm 380 is connected by a wire 386 with one side of the rotary solenoid 384, the second side of the rotary solenoid being connected to the power source. It is apparent that with all of the contacts 379 but one energized by the pairs of contacts 374—375, the wiper arm 380 will be advanced automatically step-by-step until it finds the de-energized contact. Thus, the data position of the data pin 26e at the reading station of the data storage wheel 20b determines the position of the wiper arm 380 and thereby determines the rotary position of the shaft 382. The shaft 382 carries the previously mentioned wiper arm 252 of the operator selector 254 (Figure 12) and carries the wiper arms 275a, 275b, and 275c of the three limit switch selectors corresponding to the three motors.

Referring again to the clock diagram in Figure 12, each of the trip solenoids A, B, C and D is operated by means of a corresponding time interval switch means 387. When a switch means 387 is energized, it, in turn, energizes the corresponding trip solenoid for a short interval only. The flow of current through a trip solenoid readies a pulse switch 283, and, when the current ceases to flow, the pulse switch sends a pulse of current to the step advance mechanism.

The manner in which the selective cyclic control system operates may be readily understood from the foregoing description. The various data pins 26a—26e at the successive stations on the data storage wheel 20b are positioned to carry out a predetermined program by means of corresponding program selector buttons 36 as heretofore described. When the step advance mechanism actuates the data storage wheel 20b to bring a new set of data pins 26a—26e to the reading station, the data pins 26a—26d "set" the contacts of the corresponding stator-rotor digital units 284a—284d of all three of the digital controllers 250a—250c. At the same time, the newly arrived data pin 26e energizes the rotary solenoid 384 to position the wiper arm 252 of the operator selector 254 for energizing the corresponding motor.

In Figures 13 and 14, the stator-rotor digit units are set to move the slide 288 of the screw machine to a position that is 4.582 inches from a reference position and the wiper arm 252 is positioned to close the No. 1 motor circuit to cause the screw machine slide to start towards this selected position. After a time delay by the delay switch 255, the motor No. 1 is energized through this circuit and the four digital wipers 298a—298d are rotated by the motor synchronously with the lead screw 286.

When the digital wiper arms 298c and 298d reach their preselected positions, they energize the first portion of the low amperage control circuit to cause the relay 318 to place the resistor 366 in the motor circuit for the purpose of reducing the motor speed. Later, the digital wiper arm 298b reaches its preselected contact to energize the additional portion of the low amperage control circuit with the result that the relay 325 places the second resistor 368 in series with the resistor 366 to slow the motor down to a creeping pace. Finally, the digital wiper arm 298a reaches its selected contact with the screw machine slide 288 located at 4.582 inches from the reference position, and the final portion of the low amperage control circuit is energized to cause the relay 332 to break the motor circuit and simultaneously to close the circuit through the delayed reversing relay. The braking of the motor circuit de-energizes the coil 260a of the clutch-and-brake assembly 262a (Figure 12) to de-clutch the motor from the lead screw 286 and to immobilize the lead screw by the brake 292a.

After a short time delay to permit the motor to decelerate, the delayed reversing switch 265a closes the motor circuit through the reverse field coil 272 and the motor operates in reverse until it reaches that one of the set of limit switches 278a that is determined by the position of the wiper arm 275a on the No. 1 limit switch selector. The motor is then de-energized with the screw machine slide 288 returned to a predetermined point for starting its next operation.

It is apparent from the foregoing that the data pins 26a—26e at the various stations on the data storage wheel 20b may be set to operate the three motors and the four trips in any desired sequence to move the three screw machine slides to predetermined points and to return the slides to selected starting points. A motor or a trip may be energized a number of times at different stages in an operating cycle with the corresponding screw machine slide returning to different starting points, each starting point being selected to save time in initiating the next operation by the same slide. It is further apparent that various kinds of operators can be controlled by the system in addition to motors and solenoids.

It is contemplated that the data storage wheel 20b will have a relatively large number of stations to be moved in sequence to the reading station so that any desired number of operations may be controlled in sequence. If only a dozen stations are required to carry out a desired operating cycle, the data storage wheel 20b may be returned automatically to a starting station at the end of each cycle, or, if desired, successive sets of twelve stations around the circumference of the data storage wheel may be used to repeat the operating cycle.

In the described example, the data storage wheel 20b is advanced one step in response to the completion of an operation. Instead, the data storage wheel 20b may be advanced at predetermined points in a cycle of rotations of some shaft that rotates continuously throughout the cycle, or, if desired, the data storage wheel may be advanced at predetermined time intervals by a clock motor.

With ninety-six stations on the data storage wheel 20*b*, and with the data storage wheel advanced every quarter hour in the manner heretofore described, the data pins thereon may be set to carry out selected operations at selected times every twenty-four hours. For example, if a group of oil wells is to be operated for only a given number of hours each day to comply with a legal restriction, the present control system may be utilized to start and stop motors and to open and close valves to carry out the pumping program automatically.

My description in specific detail of selected practices of the invention will suggest various changes, substitutions and other departures from my disclosure within the spirit and scope of the appended claims.

I claim as my invention:

1. In a system for carrying out a predetermined cycle of operations, the combination of: a plurality of operators to perform the operations of the cycle; a corresponding plurality of prime movers for actuating the operators; a series of stator-rotor units for each of said operators corresponding to different orders of a numerical system for designating selected positions of the operator, each of said units having a wiper and a set of contacts corresponding to the digits of the numerical system, the units of each series being connected in cascade for relative rotation at different speeds in accord with orders and being operatively connected with the corresponding operator for actuation synchronously therewith; a data storage support movable along a predetermined path past a reading station, said support having a sequence of stations thereon for positioning one at a time at said reading station; a data element at each of said support stations for each of the different orders represented by said stator-rotor units, each of said elements being movable relative to the support selectively to positions representing the different digits of the numerical system; a series of data sensing means at said reading station corresponding to said data elements to sense the digit positions thereof; a corresponding series of means responsive to said data sensing means, respectively, to set said stator-rotor units in accord with the positions of the respective data elements; and means to energize said prime movers, each of said energizing means being responsive to the settings of the corresponding stator-rotor units to de-energize the corresponding prime mover when the corresponding operator reaches a position represented by the setting of the corresponding stator-rotor units.

2. A system as set forth in claim 1, which includes a step actuator and means to energize said step actuator for advance of said data support one step when an operator completes an operation represented by a position of said data elements.

3. A system as set forth in claim 1, which includes means to energize said prime movers for return of the corresponding operators to predetermined starting position in response to arrival of the operators at positions represented by the settings of said data elements.

4. A system as set forth in claim 1 which includes a clutch to disconnect each of said operators from the corresponding prime mover, and means to immobilize the operator in response to completion of an operation by the operator as represented by the positions of said data elements.

5. In a system for carrying out a predetermined cycle of operations, the combination of: a plurality of operators to perform the operations of the cycle; a corresponding plurality of prime movers for actuating the operators; a series of stator-rotor units for each of said operators corresponding to different orders of a numerical system for designating selected positions of the operator, each of said units having a wiper and a set of contacts corresponding to the digits of the numerical system, the units of each series being connected in cascade for relative rotation at different speeds in accord with orders and being operatively connected with the corresponding operator for actuation synchronously therewith; a data storage support movable along a predetermined path past a reading station, said support having a sequence of stations thereon for positioning one at a time at said reading station; a set of circuits for each order of said stator-rotor units represented respectively by the digits of said numerical system, said circuits being connected in parallel with the corresponding sets of contacts of the units; a data element at each of said support stations for each of the different orders represented by said circuits, each of said data elements being movable relative to the support selectively to positions representing the different digits of the numerical system; a set of switches at said reading station for each of said sets of circuits, each of said sets of switches being operable selectively by the corresponding data element in accord with the digit position of the element; a selector element at each of said support stations movable relative to the support selectively to a plurality of positions corresponding to the plurality of operators; means at said reading station to sense the selected positions of the selector elements; and means to energize said prime movers under control of said sensing means and said plurality of switches to position said wipers at the contacts corresponding to the digit positions of said data elements.

6. Means for automatically positioning a member at selected positions, comprising: a series of stator-rotor units corresponding to different orders of digits of a numerical system for designating selected positions of said member, each of said units having a wiper and a set of contacts corresponding to the digits of the numerical system, the units of each series being connected in cascade for relative rotation at different speeds in accord with their orders and being operatively connected with said member for actuation synchronously therewith; a program control means movable relative to a reading station; a series of data elements on said program control means corresponding to said stator-rotor units, said data elements being movable as a group with said control means to said reading station, each of said elements being movable selectively relative to the program control means to positions representing the different digits of the numerical system; a series of means at said reading station corresponding to said data elements to sense the digit positions of the data elements respectively; a corresponding series of means responsive to said sensing means to set said stator-rotor units in accord with the positions of the data elements; and means responsive to the settings of said stator-rotor units to move said member to positions represented by said data elements.

7. In a system for accurately positioning a rotary member at selected rotary positions over a range of a large number of revolutions, the combination of: a series of stator-rotor units corresponding to different orders of digits of a numerical system, each of said units having a wiper and a set of contacts representing the different digits of its order; gearing operatively connecting said series of stator-rotor units in cascade for relative rotation at speeds in accord with their orders; means operatively connecting said series of units with said rotary member of actuation synchronously therewith; a prime mover to actuate said rotary member together with said series of stator-rotor units; a set of circuits for each of said stator-rotor units including the corresponding set of contacts; a series of data elements corresponding to said series of units, each of said set data elements being movable selectively to a plurality of positions corresponding to the sets of circuits; a set of switches for each of said sets of circuits, each of said sets of switches being operable selectively by the corresponding data element in accord with the position of the element; and means to energize said prime mover under control of said switches to position said wipers at the contacts corresponding to the positions of said data elements.

8. A combination as set forth in claim 7, in which said switches are normally open, but close in response to the positioning of the corresponding data element at positions corresponding to the switches; and which includes a control circuit including all of said wipers to stop the prime mover at the selected position of said rotary member.

9. A combination as set forth in claim 8, in which said control circuit comprises parallel circuits for control in sequence by said stator-rotor units; and which includes means responsive to said parallel circuits to decelerate said prime mover as it approaches the selected position of the rotary member.

10. A combination as set forth in claim 8, which includes a clutch to disconnect said rotary member from the prime mover and a brake to immobilize the rotary member, both in response to the arrival of the rotary member at the selected position.

11. A combination as set forth in claim 8, which includes means to reverse the rotation of said rotary member by said prime mover in response to the arrival of the rotary member at the selected position, and means to stop the reversely rotating rotary member in response to arrival thereof at a predetermined starting position.

12. In a system of the character described, a data storage device, comprising: a movable support; a plurality of data elements on said support spaced apart in the direction of movement of the support, each of said data elements being movable relative to the support selectively to a series of positions representing different data values; reading means at a reading station adjacent said support to sense the positions of said data elements, said reading means comprising means movable to measure the distance of a data element from a reference position and to generate a number of signals in accord with the measurement; and means to move said support to position said data elements at said station one at a time for cooperation with said reading means.

13. A combination as set forth in claim 12, in which said reading means comprises: a member movable from a reference position towards the data element at the reading station along the path of movement of the element relative to the support; reversible means to move said member towards the data element in response to the arrival at the data element at said reading station; yielding means at the advancing end of said member to reverse said reversible means for return of the member to its reference position in response to contact of the yielding means with the data element; and means responsive to the movement of said member to generate a number of signals varying with the magnitude of movement of the member relative to its reference position.

14. In a system of the character described, a data storage device comprising: a support movable along a predetermined path; a plurality of spaced elongated data elements mounted on said support with their axes transversely of said path, each of said data elements being movable on its axis through a series of positions representing a corresponding series of data values; reading means at a station adjacent said path for contact with the data elements at said station to detect the data positions of he elements; means to move said support to position said data elements at said station one at a time for cooperation with said reading means; data input means adjacent said path to shift said elements from retracted positions to selected data position; and resetting means adjacent said path to restore the elements to their retracted positions.

15. A combination as set forth in claim 14, in which said data input means comprises: a setting member positioned to register with a data element; a series of manually operable means corresponding with the series of data positions of the data elements for shifting said setting member; and means to limit said manually operablee means to movements of different magnitudes in accord with the different data positions of the data elements.

16. A control system for automatically positioning a rotatable member selectively at a series of rotary positions in a predetermined sequence, comprising: a support movable along a predetermined path past a reading station; a plurality of spaced data elements on said support spaced apart in the direction of movement of the support, each of said data elements being movable relative to the support selectively to a series of positions representing different data values; a step advance mechanism to actuate said support to position said data elements at said station one at a time in sequence; means to actuate said step advance mechanism intermittently; a series of switch means at said station corresponding to said series of data value positions and operative in response to the corresponding positions of said data elements; a first contact means comprising a circular series of contacts corresponding to said data positions of the data elements; a second contact means in the form of a rotary wiper for sequential cooperation with said series of contacts, one of said contact means being operatively connected to said rotatable member for rotation therewith; electrical means to actuate said one contact means together with the rotatable member; and circuitry including said series of switches, said series of contacts, said rotary wiper and said electrical means to position said one contact means with said wiper at the contact in said series of contacts corresponding to the switch means operated by the data element at said station.

17. A combination as set forth in claim 16, in which said series of contacts is normally energized by said switch means, and in which operation of a switch means by one of said data elements de-energizes the corresponding contact in said series of contacts to cause said wiper to register therewith.

18. A combination as set forth in claim 16, which includes a corresponding series of indicating signal means to designate the various positions of said data elements, said indicating signal means being responsive to the corresponding switch means in said series of switch means.

19. In a system of the character described, the combination of: a support member movable along a predetermined path, said support member having a sequence of stations thereon movable thereby one at a time to a reading station along said path; a data element at each of said stations movable relative to said support means transversely of said path to selected positions representing different data values; a plurality of switches at said reading station representing said different data values and arranged in a row transversely of said path for selective operation by impingement of said data elements as the data elements reach the reading station; and means to advance said support member to bring said stations on the support to said reading station in sequence.

20. A control system for automatically positioning a rotary member selectively at a series of rotary positions in a predetermined sequence, comprising: a support movable along a predetermined path past a reading station; a plurality of spaced data elements on said support spaced apart in the direction of movement of the support, each of said data elements being movable relative to the support from a retracted position selectively to a series of positions representing different data values corresponding to different positions of said data elements; means to actuate said support to position said data elements at said station one at a time in sequence; reading means at said station to measure the distance of a data element at the station from its retracted position and to generate a series of signals corresponding in number to the measured distance; means to move said rotary member to a home position when said support is advanced one step, said home position corresponding to the retracted position of a data element; and means responsive to said series of signals to advance said rotary member from its home position to a position corresponding to the data position of the data element at said station.

21. A combination as set forth in claim 20, in which said reading means comprises a sensing member movable in one direction against a data element from a reference position; means responsive to contact of said sensing member against said data element to return the sensing member to its reference position; and signal generating means responsive to one of the two directions of movement of said sensing member.

22. A combination as set forth in claim 21, in which said signal generating means responds to the return movement of said sensing member to delay the signals until the operation of said homing means is completed.

23. In a system of the character described, a data storage device, comprising: a movable support; a plurality of data elements on said supports spaced apart in the direction of movement of the support, each of said data elements being movable relative to the support selectively to a series of positions representing different data values; reading means at a reading station adjacent said support to sense the positions of said data elements, said reading means comprising a plurality of switch means responsive respectively to the different data positions of said data elements; and means to move said support to position said elements at said station one at a time for cooperation with said reading means.

24. In a system of the character described, a data storage device, comprising: a movable support; a plurality of data elements on said support spaced apart in the direction of movement of the support, each of said data elements being movable relative to the support selectively to a series of positions representing different data values; sensing means at a reading station adjacent said support; means to move said sensing means from a normal reference position in one direction against a data element on said movable support at said reading station; means responsive to contact of said sensing means with the data element to reverse the movement of the sensing means to return the sensing means to its normal reference position; and signal generating means responsive to one of the two directions of movement of said sensing means to generate a number of signals with the number of signals varying in accord with the magnitude of movement of the sensing means.

References Cited in the file of this patent

UNITED STATES PATENTS

| | | |
|---|---|---|
| 2,480,589 | McKenney | Aug. 30, 1949 |
| 2,505,262 | Torcheux | Apr. 25, 1950 |
| 2,574,097 | Foster | Nov. 6, 1951 |
| 2,637,835 | Davidson | May 5, 1953 |